Patented Sept. 13, 1932

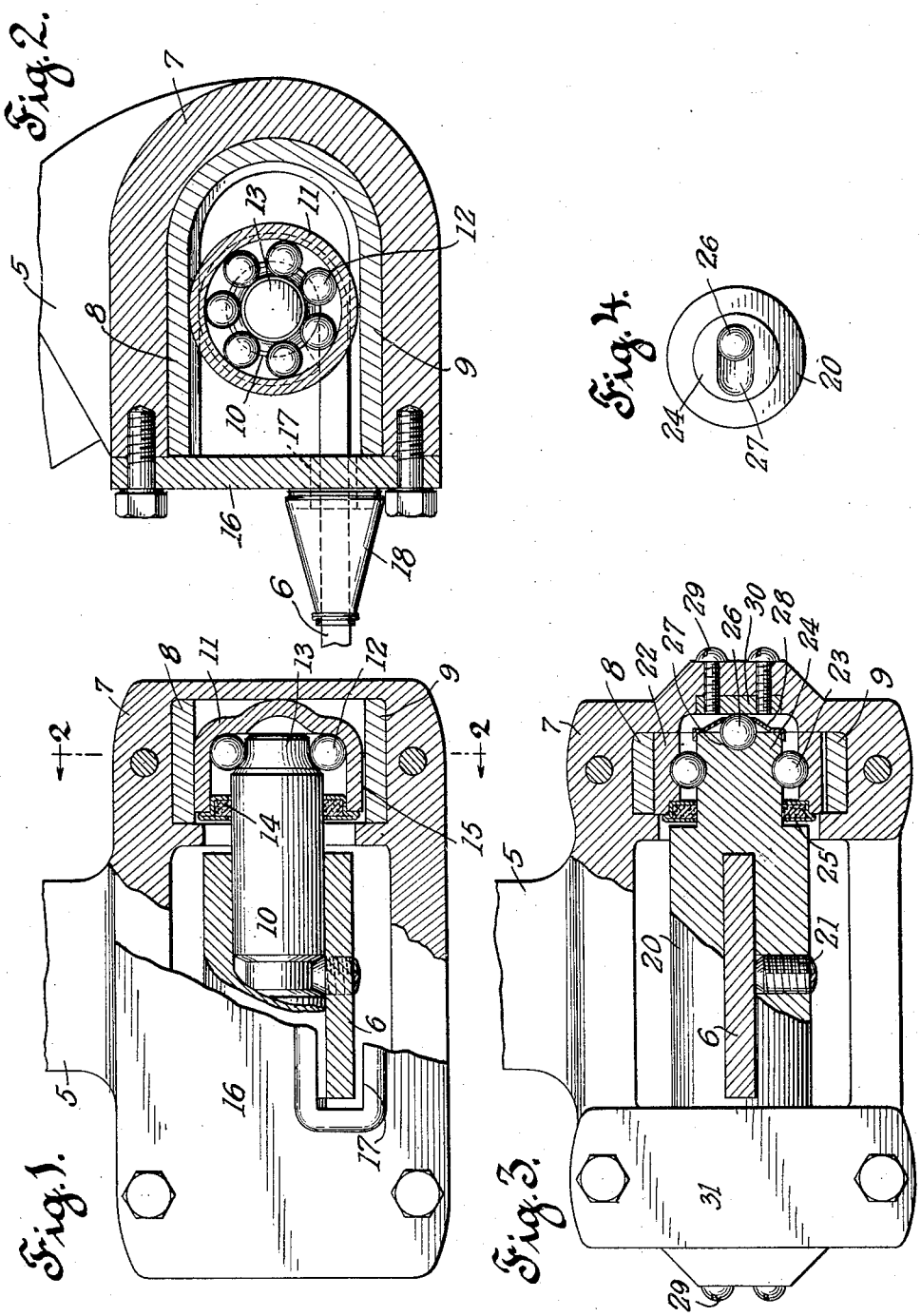

1,877,734

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING CONNECTION

Application filed April 13, 1929. Serial No. 354,721.

My invention relates to a spring end connection for connecting the frame and spring of a motor vehicle.

It is an object of the invention to provide a compact antifriction connection to take the place of the usual shackle link construction.

It is another object to provide an antifriction bearing spring connection which will be quiet in operation and serviceable in use.

It is an other object to provide an antifriction spring end connection consisting of relatively few and simple parts, which will be serviceable in use, relatively cheap to manufacture, and not likely to get out of order.

Other objects will appear as the specification proceeds.

Briefly stated, in a preferred form of the invention I provide a frame member, which may be integral with or rigidly connected to the chassis of a motor vehicle and provided with spaced apart track members preferably of relatively resilient material, such as fiber, leather, or rubber. The other member (in this case the spring) is provided with means such as a pin projecting from opposite sides thereof and having antifriction bearings, such as ball bearings, at the ends thereof. The outer raceway members of the bearings are adapted for rolling contact with the tracks. It is desirable to have opposed tracks at each side so that upon a severe rebound the outer raceway members may be supported on the lower or opposed tracks, and thus there will be little play, and by reason of the relatively resilient seats the connection will be relatively quiet. The antifriction bearings are preferably so housed as to exclude dust and water and to retain lubricant where required.

In the drawing which show, for illustrative purposes only, preferred forms of the invention—

Fig. 1 is a fragmentary end view of a spring and frame connected by one form of my improved spring and connection, parts being shown in section;

Fig. 2 is a sectional view taken substantially in the plane of the line 2—2 of Fig. 1;

Fig. 3 is a view similar to Fig. 1, but illustrating a modification;

Fig. 4 is an end view of a detail shown in Fig. 3.

Referring first to that form shown in Figs. 1 and 2, 5 indicates a frame forming part of or to be secured to one of the members to be connected (in the present case the frame of a motor vehicle), while 6 indicates the other member (in this case the spring). The frame is provided with a housing having spaced apart bosses, as 7, thereon. Within the bosses are tracks 8 which may be and preferably are of resilient material, such as fiber, leather, or rubber. Opposed to each upper track 8 is preferably a corresponding lower track 9.

The spring 6 is provided with means such as a pin 10 projecting from opposite sides and carrying antifriction bearings at the ends thereof. In the particular form illustrated in Figs. 1 and 2, the antifriction bearings include outer raceway members such as the cups 11 and balls 12 interposed between suitably formed raceways in the cups and inner raceways 13, which, as herein specifically shown, are formed directly upon the pin ends. The annular space between the pin 10 and the cup 11 is preferably closed by a dust ring 14 which may include a felt ring suitably held in a metallic retainer, as shown. Dust and water may thus be excluded from the balls and bearing surfaces, and a sufficient supply of lubricant may be thereby retained on the bearing surfaces. The outer rings 11 are positioned for normal rolling engagement with the upper tracks 8—8, and the spacing of the tracks 8-9 is such that there may be a slight clearance, as indicated at 15, between the cup 11 and one of the tracks.

The housing of the frame 5 may be and preferably is substantially enclosed by a cover cap member 16 suitably secured to the frame 5. The cap member may be provided with a relatively large opening 17 therein for the passage of the spring 6. A boot 18, or the equivalent, may serve to complete the enclosure of the housing and yet permit free spring movement.

It will be seen that with the particular forms of antifriction bearings employed, both radial and end thrusts are taken by the balls 12. The outer rings 11 are positioned to engage the end wall 19 of the bosses 7—7 so as to afford suitable abutment surfaces during the action of the spring. During the flexing of the spring 6, the end carrying the pin 10 will, of course, move back and forth within the housing. The slight rotative action of the spring end will be cared for by the rolling action of the balls 12, and during in and out movement of the spring 6 the outer ring 11 will roll on the upper track 8. There will be some sliding action between the bottom of the cup 11 and the housing wall 19, but the greatest forces, that is, those forces due to the weight of the car, will be taken by the balls 12, and it is only the relatively smaller end thrusts which must be taken care of by the sliding contact between the bottom of the cup 11 and the wall 19. Upon a severe rebound, the outer raceway members 11 may leave the upper tracks 8 and in so doing engage the lower tracks 9. Since both tracks 8 and 9 are preferably of relatively resilient and sound-deadening material, there will be no substantial rattling during severe flexing and rebound of the spring.

In that form of the invention shown in Figs. 3 and 4, the frame 5 is also provided with bosses 7—7 and upper and lower tracks 8–9, which may be the same as or similar to corresponding elements in the previously described form. The spring 6, instead of surrounding the bearing pin 20, may be securely held in a slot passing transversely through the pin 20 as by means of a set screw 21. The ends of the pin in this latter form are also provided with antifriction bearings which include outer rings 22 with balls 23 interposed between such rings and the ends of the pin. In the form shown in Figs. 3 and 4, however, the antifriction bearings are of the type known as radial bearings, which may have relatively deep ball grooves formed in the rings 22 and pin ends 24, so that the outer rings are constrained by the balls to move longitudinally with the pin. The space between each ring 22 and the surface of the pin 20 may be closed by one or more felt or other dust rings 25 similar to that previously described.

The end thrusts on the pin 20 may be taken by antifriction bearing members such as a ball 26 at each end of the pin. Such balls may be located in a groove 27 formed in the pin end and held therein as by means of a retainer 28. The complementary surface for engagement by the balls 26 may be formed of a resilient strip of fiber or the like 29 held in each bearing boss 7. If desired, the abutment strip 29 may be adjustable, as by means of the screws 30—30, so as to provide only the necessary end play for the pin 20.

Instead of closing the housings 7—7 of Fig. 3 by a single cover plate as 16 of Fig. 1, I may employ individual cover caps as 31.

The operation of that form of spring end connection shown in Figs. 3 and 4 is substantially the same as that shown in Figs. 1 and 2.

It will be seen that a spring connection of the type herein disclosed provides a very compact arrangement which may take the place of the usual shackle construction which, because of the length of links required to provide for flexure of the spring, occupies considerable vertical space. The bearing surfaces may be so enclosed as to retain lubricant where required and so as to prevent access of dust and water. Due to the somewhat yielding tracks, the present spring end connection will be relatively quiet in operation.

While the invention has been described in considerable detail and two different embodiments illustrated, it is to be understood that I do not wish to be strictly limited to the forms shown since changes may be made within the scope of the invention as defined in the appended claims.

I claim:

1. In a spring end connection, means to be carried by a spring and having antifriction bearings thereon at opposite sides of said spring, each bearing including an outer raceway member, means to be carried by a frame and having trackways thereon for receiving the outer raceway members in rolling engagement therewith, and means for guiding said raceway members during rolling.

2. In a spring end connection, a housing member having tracks thereon, means having spaced apart antifriction bearing members including outer bearing raceway members with rolling bearing elements therein, said outer raceway members being in rolling engagement with said tracks, and means for grinding said outer raceway members longitudinally.

3. In a spring end connection, pin means to be secured to a spring and projecting from opposite sides thereof, outer antifriction raceway members at each end of said pin means, antifriction bearing members interposed between said raceway members and said pin ends, track members to be carried by a frame and to receive said outer raceway members in rolling engagement therewith, and means for guiding said raceway members during rolling.

4. In a spring end connection, a frame having spaced apart tracks thereon, means to be carried by a spring and having antifriction bearings at opposite sides of said spring, said antifriction bearings including outer raceway members and antifriction bearing members therein, said outer raceway members being positioned for rolling engagement on said tracks, and rolling members for resisting end thrusts of said pin means.

5. In a spring end connection, a frame having track portions thereon of relatively resilient material, means to be carried by a spring and having antifriction bearings including outer raceway members on opposite sides of said spring, said outer raceway members being positioned for rolling engagement with said track portions, for the purpose described.

6. In a spring end connection, a housing having spaced apart track portions thereon, each track portion including upper and lower tracks of relatively resilient material, means to be carried by a spring and having antifriction bearings at opposite sides thereof, each bearing including an outer raceway member, said raceway members being positioned for normal rolling engagement with said upper tracks and adapted at times for rolling engagement with said lower tracks.

7. In a spring end connection, a housing member having upper and lower tracks at opposite sides thereof, cover means for the ends of said tracks, means to be carried by a spring and having antifriction bearings at opposite sides of said spring, said antifriction bearings including outer race members positioned for rolling contact with said track members.

8. In a spring end connection, pin means to be carried by a spring and extending from opposite sides thereof, antifriction raceway members surrounding the ends of said pin means, antifriction bearing members interposed between said outer raceway members and said pin means, closure means for closing the annular space between each said outer raceway member and corresponding end of said pin means, means having tracks thereon positioned to receive said outer raceway members in rolling engagement therewith, and means for guiding said raceway members longitudinally.

9. In a spring end connection, means having spaced apart tracks thereon, pin means to be secured to a spring and projecting beyond the sides thereof, cups surrounding the ends of said pin means and positioned for rolling engagement with said tracks, antifriction bearing members interposed between said cups and the ends of said pin means, the bottoms of said cups being positioned for sliding engagement with a part of said housing for taking end thrusts.

10. In a spring connection, a closed housing member having a passage at one end and having upper and lower tracks, an antifriction bearing comprising raceways with antifriction bearing members therebetween, one of said raceways being adapted to ride along on one of said tracks, and a spring and frame being connected by said housing and antifriction bearing, one of said raceways being carried by one of said connected members.

11. In a spring connection, a frame, a spring, a track member of resilient material carried by one of said members, and an antifriction bearing comprising raceways with interposed antifriction bearings carried by the other of said members, one of said raceways being adapted to roll on said track, for the purpose described.

12. In a spring connection for connecting a spring member and frame member, one of said members having a track, the other of said members having an anti-friction bearing comprising raceways with antifriction bearings therebetween, one of said raceways being carried by one of said members and the other of said raceways being supported from said track and movable therealong, whereby said spring and frame members are anti-frictionally connected.

RAYMOND R. SEARLES.